(No Model.)

J. G. GARLAND.
Apparatus for Moistening the Air.

No. 236,319. Patented Jan. 4, 1881.

Attest:
R. T. Barnes.
F. L. Middleton.

Inventor:
James G. Garland
By Elec. Spear
atty

UNITED STATES PATENT OFFICE.

JAMES G. GARLAND, OF BIDDEFORD, MAINE.

APPARATUS FOR MOISTENING THE AIR.

SPECIFICATION forming part of Letters Patent No. 236,319, dated January 4, 1881.

Application filed October 18, 1880. (No model.)

*To all whom it may concern:*

Be it known that I, JAMES G. GARLAND, of Biddeford, in the county of York and State of Maine, have invented a new and useful Improvement in Apparatus for Moistening the Air; and I do hereby declare that the following is a full, clear, and exact description of the same.

My invention relates to apparatus for moistening the atmosphere, such as that shown in my patent of July 1, 1873, reissued August 12, 1879, and in patent granted me December 23, 1879.

The object of the invention is to secure a simple and efficient device for straining the water which is supplied to the atomizer, and to make such a device easily applicable to the form of apparatus shown in my said patents.

It consists of a tubular strainer adapted to fit into the liquid-holder, provided with a flange, by means of which it rests upon or is connected to said holder, and provided, also, with an opening to admit the liquid-leg of the atomizer-tube, all as hereinafter fully set forth.

Figure 1:
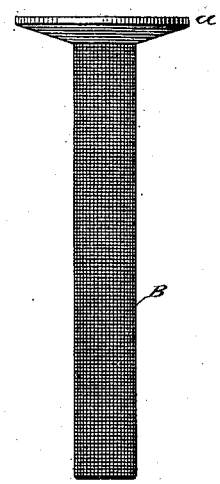
Figure 2:
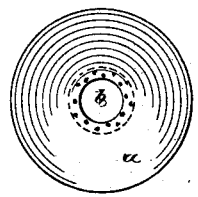
Figure 3:
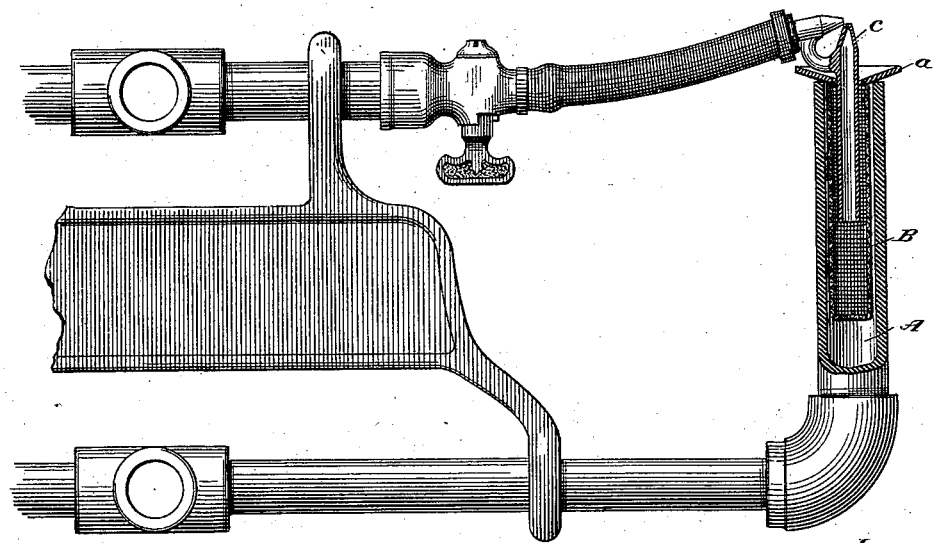

In the accompanying drawings, Figure 1 represents the strainer in side elevation. Fig. 2 is a top view of the same. Fig. 3 shows a vertical central section through liquid-holder, strainer, and liquid-leg.

The liquid-holder (marked A) is the same in form as that shown in patent heretofore granted me, and is fixed vertically upon the tube which supplies it with water. The water in this holder is maintained at a certain level, suited to the operation of the apparatus. Within this holder I place a tubular strainer, B, which is made of such diameter that it will slip easily therein. The body of this strainer is made of fine wire-netting or equivalent perforated material, the interstices of which will not admit any substance which will not pass through the opening of the atomizing or other tube. The strainer is provided at its upper end with a flange, *a*, by means of which it rests upon the edge of the holder or cup A. This flange is made preferably cup-shaped or concave, and is provided with a central opening, *b*, to admit the liquid-leg of the atomizer *c*, which, when inserted in its place, extends down into the interior of the strainer. The flange may have its edge turned up or down, and be threaded on the cylindrical part so formed, for screwing upon the cup or holder. The flange serves as a cover to the cup, and also to catch any drippings from the outlet and to convey such drippings back to the cup or holder. For the latter purpose it may be provided with small openings outside the central opening, so as to return the dripping outside of the strainer.

The cover may be separate, if desired, from the strainer; but I prefer to make them as represented.

What I claim is—

In combination, the cup or holder A, the leg *c* of the atomizer, and the straining-tube B, surrounding the atomizer-leg and provided with a drip-cup, *a*.

In testimony whereof I have signed my name to this specification in the presence of two subscribing witnesses.

JAMES G. GARLAND.

Witnesses:
C. A. MOODY,
R. H. INGERSOLL.